United States Patent Office 2,989,321
Patented June 20, 1961.

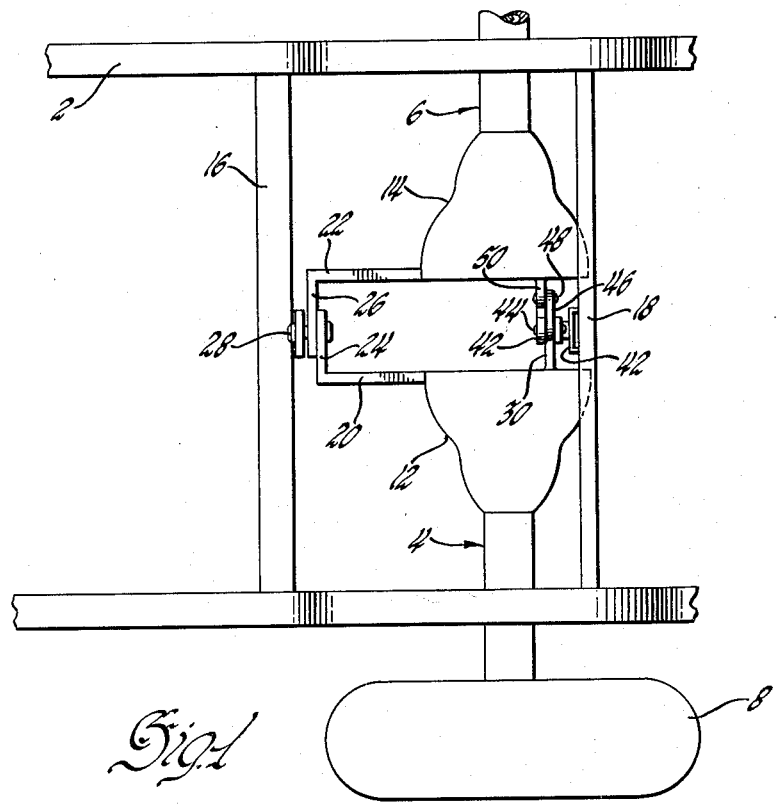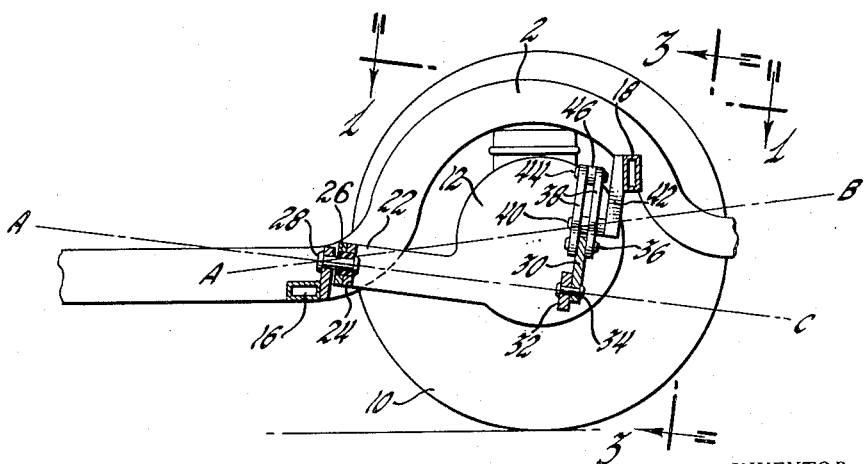

2,989,321
SWING AXLE REAR SUSPENSION
Johannes Rosenkrands, Detroit, Mich., assignor to General Motors Corporation, Detroit, Mich., a corporation of Delaware
Filed Jan. 2, 1959, Ser. No. 784,531
9 Claims. (Cl. 280—124)

This invention relates to swing axle suspension for vehicle driving wheels and more particularly to means for connecting the swinging half axles to the vehicle sprung mass.

As used herein, the expression "swing axle suspension" is intended to refer to an arrangement wherein each of the driving wheels of a vehicle are connected to the sprung mass thereof by a single wheel control arm deflectable about an axis extending generally longitudinally of the vehicle.

In general, swing axle constructions are divided into two broad categories commonly identified as side pivot and center pivot. In the former, the inboard pivotal connections of each axle are spaced laterally from each other, while in the latter construction the axles are arranged to swing about a more or less common axis. The present invention is primarily concerned with the latter.

For reasons of extreme simplicity of form and operation, the classic swing axle has long been regarded as a highly desirable means of securing the driving wheels of a vehicle to the sprung mass. However, the mechanical simplicity of the structure involved also imposes certain inherent disadvantages which have heretofore defied adequate solution. Thus, because a single axis of wheel motion is characteristic of known forms of swing axles, in the past it has not been possible to achieve certain vehicle operational and handling characteristics which are either present or relatively easily introduced in other forms of rear axle suspension. For example, design experience has shown that driving wheel suspension should possess, among other characteristics, the ability to induce a controlled degree of understeer responsive to roll deflection of the sprung mass. In addition, the suspension should also be capable of resisting "squatting" or downward deflection of the sprung mass during vehicle acceleration. Inability of prior art swing axle suspensions to perform both of the two separate functions just described results from the fact that the axis of wheel motion required in each case is significantly dissimilar. Since conventional swing axle suspension employ fixed inboard pivot axes, it will be evident that such structures could provide either one or the other of the desired functions, but not both.

An object of the present invention is to provide an improved swing axle suspension.

Another object is to provide a swing axle suspension capable of inducing a controlled degree of understeer and of resisting acceleration squat.

Still another object is to provide a swing axle suspension in which the individual half axles are pivotally connected to the sprung mass of the vehicle so as to provide dissimilar wheel deflection axes when the sprung mass is under the influence of parallel deflection and roll deflection, respectively.

Yet another object is to provide an arrangement of the stated character in which the individual half axles are connected to the sprung mass of a vehicle at points defining a longitudinally extending axis.

A still further object is to provide a structure of the stated character in which the only connection between both half axles and the sprung mass is disposed between the half axles and extends longitudinally of the vehicle.

These and other objects, advantages, and features of the invention will become more fully apparent as reference is had to the accompanying specification and drawings wherein:

FIG. 1 is a fragmentary plan view of the rear portion of a vehicle taken on the line 1—1 of FIG. 2 illustrating the form and arrangement of connection of a pair of half axles to the vehicle sprung mass in accordance with the invention;

FIG. 2 is a side elevational view, partly in section, of the structure shown in FIG. 1;

Figure 3:
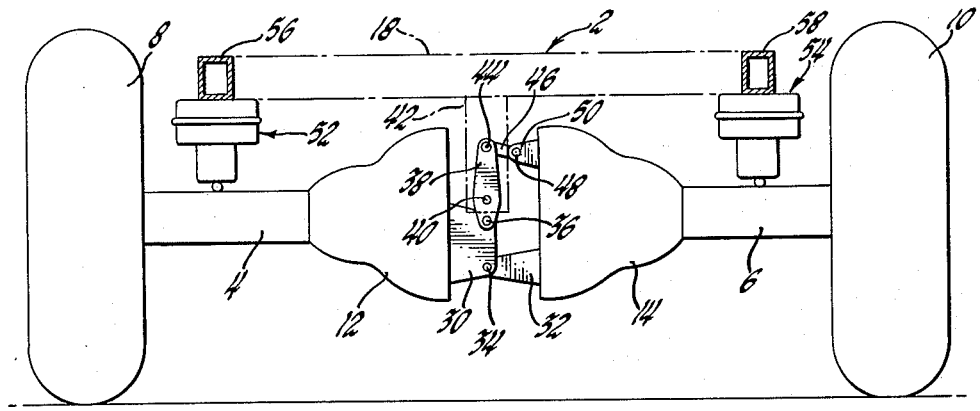
FIG. 3 is a rear end view looking in the direction of arrows 3—3 of FIG. 2.

Referring now to the drawings and particularly FIGS. 1, 2 and 3, reference numeral 2 designates generally the frame or sprung mass of the rear portion of a vehicle. Disposed below and extending transversely of frame 2 are a pair of oppositely extending wheel control arms in the form of axle housings 4 and 6 having traction wheels 8 and 10 rotatably supported at their outer ends. It will be understood that wheels 8 and 10 are rotatably driven in a known manner by live axles, not shown, which may be carried interiorly of the housing and extend outwardly therethrough for connection with wheels 8 and 10.

In accordance with the present invention, housings 4 and 6 are formed with enlarged inboard casing portions 12 and 14 which are connected to forward and rearward cross frame members 16 and 18 for oscillation about an axis extending generally longitudinally of the vehicle. As seen best in FIGS. 1 and 2, portions 12 and 14 are provided with a forwardly projecting arm 20 and 22, respectively, the forward ends 24 and 26 of which are turned laterally inwardly and connected to cross frame member 16 by a common rubber bushed pivot member 28. As seen best in FIG. 3, the rearward ends of portions 12 and 14 are provided with inwardly extending brackets 30 and 32, respectively, which are pivotally connected together by a pin joint 34. Bracket 30 is additionally connected by a pin joint 36 to a vertically extending lever 38 which is pivotally mounted by rubber bushed pivot members 40 on a depending portion 42 formed integrally on cross frame member 18. At its upper end, lever 38 is pivotally connected by pin joint 44 to a generally transversely extending link 46, the opposite end of which is connected by pin joint 48 to a bracket 50 formed on casing portion 14 above bracket 32. The entire sprung mass 2 is then resiliently supported with respect to axles 4 and 6 by means of an elastic medium such as air springs 52 and 54 disposed between frame side rails 56 and 58 and vertically adjacent portions of axles 4 and 6.

In operation, a structure of the type just described functions geometrically to provide a controlled degree of understeer when the vehicle is negotiating a turn, while under conditions of acceleration, the geometric action is modified to resist the tendency of the sprung mass to deflect downwardly. In order that the operation of the structure may be more fully understood, a description thereof follows. By reference to FIG. 2, it will be seen that pivots 28 and 40 provide a first imaginary axis A—B, while the pivots 28 and 34 provide a second imaginary axis A—C. Axis A—B is tilted downwardly at its forward end so that upward deflection of axle 4 about said axis causes its associated wheel to toe-in, while downward deflection of axis 6 causes its associated wheel to toe-out, the combined effect of toe-in and toe-out of the respective wheels resulting in a change in the plane of the wheels with respect to the longitudinal centerline of the vehicle which results in steering inclination in a direction tending to steer the vehicle out of the turn in which it is engaged. It will be apparent that roll deflection of sprung mass 2 in a counterclockwise direction will result in movement of the axles relative to the sprung mass in the manner described. It will also be evident that opposite or clockwise roll deflection of the sprung mass will cause steering inclination of the respective wheels in a direction opposite to that described.

Considering now the case of parallel ride deflection wherein the sprung mass descends in parallel relation to the ground, it will be seen that axis A—C is tilted upwardly at its forward end so that during vehicle acceleration, wheel deflection about the said axis exerts a component of thrust resisting the tendency of the sprung mass to descend or squat.

Figure 4:
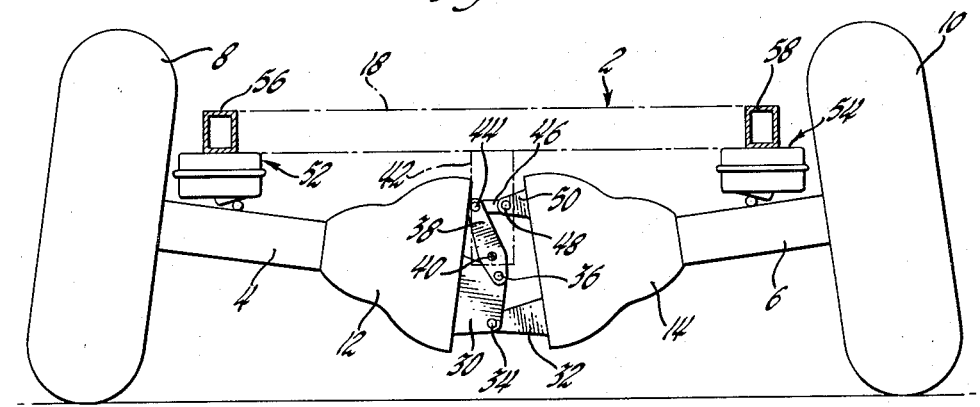
FIG. 4 is a view similar to FIG. 3 illustrating the kinematic relation of the axle construction when the vehicle sprung mass is acted upon by force causing parallel downward deflection.
Figure 5:
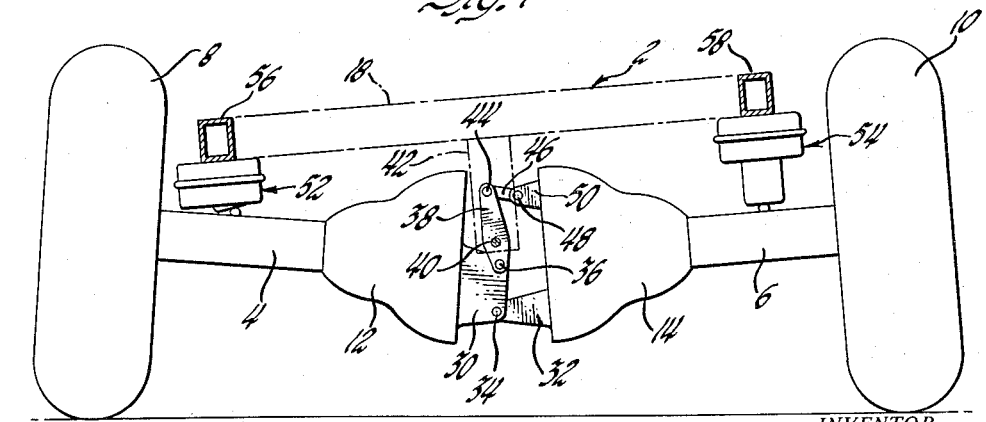
FIG. 5 is a view similar to FIG. 3 illustrating the kinematic relation when the sprung mass is under the influence of forces causing roll deflection to the left, as seen from the rear.

By reference to FIGS. 3, 4 and 5, it will be observed that alternate deflection of the wheels about axes A—B and A—C, respectively, is a function of the mechanical limiting influence of lever 38 and link 46. As seen best in FIG. 4, parallel ride deflection requires that both axles 4 and 6 swing upwardly through corresponding angles. Because the common pivotal connection 34 between brackets 30 and 32 is spaced vertically below pivot 40, this equal upward angular movement of the axles about the latter pivot is mechanically impossible and must therefore occur about pivots 28 and 34 or the imaginary axis A—C. However, in roll deflection, the sprung mass and depending portion 42 are free to rotate bodily about pivot 40. Therefore, corollary deflection of axles 4 and 6 with respect to the sprung mass takes place about the pivots 28 and 40 or the axis A—B. In the latter instance, it will be noted that axles 4 and 6 assume dissimilar angles of deflection relative to frame 2, which, in accordance with the invention are determined by dimensioning of linkage 30, 32, 38, 46 and 50 and location of the respective pivots 34, 36, 40, 44 and 48. Since such dimensioning will vary in each individual case, it will be understood that determination of proper dimensioning will be calculated in accordance with accepted layout procedure to conform to the basic design configuration involved.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In a motor vehicle, swing axle suspension comprising a sprung mass, a pair of transversely oppositely extending half axles, longitudinally spaced pivot means connecting said half axles together for swinging movement about a common longitudinal axis, one of said pivot means being mounted on said sprung mass, and means including additional pivot means located above said common axis articulatably supporting the other of said first mentioned pivot means on said sprung mass.

2. Independent suspension for the driving wheels of a vehicle comprising, a frame, a pair of half axles hinged together by a pair of longitudinally spaced pivot members defining a common axis, means connecting one of said pivot members in fixed relation to said frame, and linkage means articulatably connecting the other of said pivot members to said frame, said linkage means including elements interconnecting said half axles in such a way that during parallel deflection of said frame said axles swing about said common axis while during roll deflection of said frame said axles swing about an axis inclined with respect to said common axis.

3. Independent suspension for the driving wheels of a vehicle comprising, a frame, a pair of half axles hinged together by a pair of longitudinally spaced pivot members defining a common axis which slopes downwardly toward the rear, means connecting one of said pivot members in fixed relation to said frame, and linkage means articulatably connecting the other of said pivot members to said frame, said linkage means including a lever element fulcrumed on said frame kinematically related to said axles so that parallel deflection of said frame causes said axles to swing about said common axis while roll deflection of said frame causes said axles to swing about an axis passing through said lever fulcrum and sloping downwardly toward the front.

4. The structure set forth in claim 3 wherein that portion of said first mentioned axis passing through the rearwardmost pivot member is spaced vertically below the axis of rotation of said wheels.

5. The structure set forth in claim 3 wherein that portion of said first mentioned axis passing through the rearwardmost pivot member is spaced vertically below the axis of rotation of said wheels and that portion of said second mentioned axis passing through the lever fulcrum is spaced vertically above the axis of rotation of said wheels.

6. In combination with a vehicle sprung mass, a pair of transversely oppositely extending swing axles, each axle having a pair of longitudinally spaced brackets formed on the inboard end thereof, a fist common pivot member connecting one of each pair of brackets together at a fixed point on said sprung mass, a second common pivot member connecting the other of each pair of brackets together independently of said sprung mass, a lever pivoted to said sprung mass adjacent said second common pivot member, additional pivot means connecting one bracket of said last mentioned pair to one end of said lever, and a transverse link pivotally interconnecting the other end of said first mentioned lever with the axle associated with the other bracket of said last mentioned pair.

7. In combination with a vehicle sprung mass, a pair of transversely oppositely extending spring axles, each axle having a pair of longitudinally spaced inwardly extending brackets formed on the inboard end thereof, a first common pivot member connecting one of each pair of brackets together at a fixed point on said sprung mass, a second common pivot member connecting the other of each pair of brackets together independently of said sprung mass, a lever pivoted to said sprung mass adjacent said second common pivot member, additional pivot means connecting one bracket of said last mentioned pair to one end of said lever, and a transverse link pivotally interconnecting the other end of said first mentioned lever with the axle associated with the other bracket of said last mentioned pair, the connection with said last mentioned axle being spaced substantially above said second pivot member.

8. In combination with a vehicle sprung mass, a pair of transversely oppositely extending swing axles, each axle having a pair of longitudinally spaced inwardly extending brackets formed on the inboard end thereof, a first common pivot member connecting the forward brackets of each pair of brackets together at a fixed point on said sprung mass, a second common pivot member connecting the rearward brackets of each pair of brackets together independently of said sprung mass, a normally vertically extending lever pivoted on said sprung mass vertically adjacent said second common pivot member, additional pivot means connecting the rearward bracket of one axle to the lower end of said lever, an additional bracket on the other axle spaced above the rearward bracket thereof, and a link pivotally connected at one end to the upper end of said lever and at the other end to said additional bracket.

9. The structure set forth in claim 3 wherein said first and second mentioned axes intersect at a point below the axis of rotation of said wheels.

References Cited in the file of this patent

UNITED STATES PATENTS

| | | |
|---|---|---|
| 1,273,412 | Salsbury | July 23, 1918 |
| 2,612,231 | Bretschneider | Sept. 30, 1952 |
| 2,784,794 | Barenyi | Mar. 12, 1957 |
| 2,806,714 | Scherenburg et al. | Sept. 17, 1957 |
| 2,841,230 | Neuschaefer et al. | July 1, 1958 |
| 2,843,214 | Muller | July 15, 1958 |